(12) United States Patent
Kashiwagi et al.

(10) Patent No.: US 10,994,513 B2
(45) Date of Patent: May 4, 2021

(54) COMPOSITE STRUCTURE

(71) Applicant: MITSUBISHI HEAVY INDUSTRIES, LTD., Tokyo (JP)

(72) Inventors: Masahiro Kashiwagi, Tokyo (JP); Yoshinori Nonaka, Tokyo (JP); Kiyoka Takagi, Tokyo (JP); Tooru Shitani, Tokyo (JP); Toshio Abe, Nagoya (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 16/628,292

(22) PCT Filed: Jul. 3, 2018

(86) PCT No.: PCT/JP2018/025176
§ 371 (c)(1),
(2) Date: Jan. 3, 2020

(87) PCT Pub. No.: WO2019/044161
PCT Pub. Date: Mar. 7, 2019

(65) Prior Publication Data
US 2020/0139668 A1    May 7, 2020

(30) Foreign Application Priority Data
Aug. 30, 2017   (JP) .............................. JP2017-165107

(51) Int. Cl.
*B32B 5/26* (2006.01)
*B32B 5/12* (2006.01)
*B64C 1/00* (2006.01)

(52) U.S. Cl.
CPC .................. *B32B 5/26* (2013.01); *B32B 5/12* (2013.01); *B32B 2260/023* (2013.01);
(Continued)

(58) Field of Classification Search
CPC ... Y10T 428/23; Y10T 428/239; B29C 70/30; B32B 5/02; B32B 5/12; B32B 5/26; B32B 3/08; B32B 3/28; B32B 2260/023
See application file for complete search history.

(56) References Cited

U.S. PATENT DOCUMENTS 5,372,479 A   12/1994  Byrnes et al.
5,984,511 A   11/1999  Vasey-Glandon et al.
(Continued)

FOREIGN PATENT DOCUMENTS

CN     105392620     3/2016
EP     1 840 775     10/2007
(Continued)

OTHER PUBLICATIONS

International Search Report dated Oct. 2, 2018 in International (PCT) Application No. PCT/JP2018/025176.
(Continued)

*Primary Examiner* — Alexander S Thomas
(74) *Attorney, Agent, or Firm* — Wenderoth, Lind & Ponack, L.L.P.

(57) ABSTRACT

A composite structure includes a stepped portion formed by laminating a plurality of plies with end surfaces thereof being shifted from each other. The composite structure includes a body portion which includes a first structure portion where a first ply is laminated on a top layer of the first structure portion, a second structure portion where a second ply is laminated on a top layer of the second structure portion, and the stepped portion disposed between the first structure portion and the second structure portion, the second ply being positioned at a distance from the first ply in a lamination direction, and a first cover ply which includes a covering portion covering the stepped portion, one end portion, and the other end portion and is formed so as to
(Continued)

cover only a part of a surface of the first ply or a part of a surface of the second ply.

10 Claims, 9 Drawing Sheets

(52) U.S. Cl.
CPC ... *B32B 2260/046* (2013.01); *B32B 2262/106* (2013.01); *B32B 2307/54* (2013.01); *B64C 2001/0072* (2013.01); *Y10T 428/23* (2015.01); *Y10T 428/239* (2015.01)

(56) References Cited

U.S. PATENT DOCUMENTS

| | | |
|---|---|---|
| 2009/0084899 A1 | 4/2009 | Kismarton et al. |
| 2010/0096068 A1 | 4/2010 | Foo et al. |
| 2011/0135486 A1 | 6/2011 | Bendel |
| 2011/0135887 A1 | 6/2011 | Saff et al. |
| 2012/0100343 A1 | 4/2012 | Borghini-Lilli et al. |
| 2013/0103359 A1 | 4/2013 | Grandine et al. |
| 2013/0196121 A1 | 8/2013 | Beumler |
| 2016/0176500 A1 | 6/2016 | Ross et al. |

FOREIGN PATENT DOCUMENTS

| | | |
|---|---|---|
| JP | 4-530 | 1/1992 |
| JP | 8-510706 | 11/1996 |
| JP | 2012-532785 | 12/2012 |
| JP | 5184523 | 1/2013 |
| JP | 2013-512798 | 4/2013 |
| JP | 2016-534295 | 11/2016 |
| JP | 6089036 | 3/2017 |

OTHER PUBLICATIONS

International Preliminary Report on Patentability dated Mar. 12, 2020 in International (PCT) Application No. PCT/JP2018/025176 with English-language translation.
Office Action dated Jan. 29, 2021 in corresponding Chinese Patent Application No. 201880035083.4, with Machine Translation, 20 Pages.

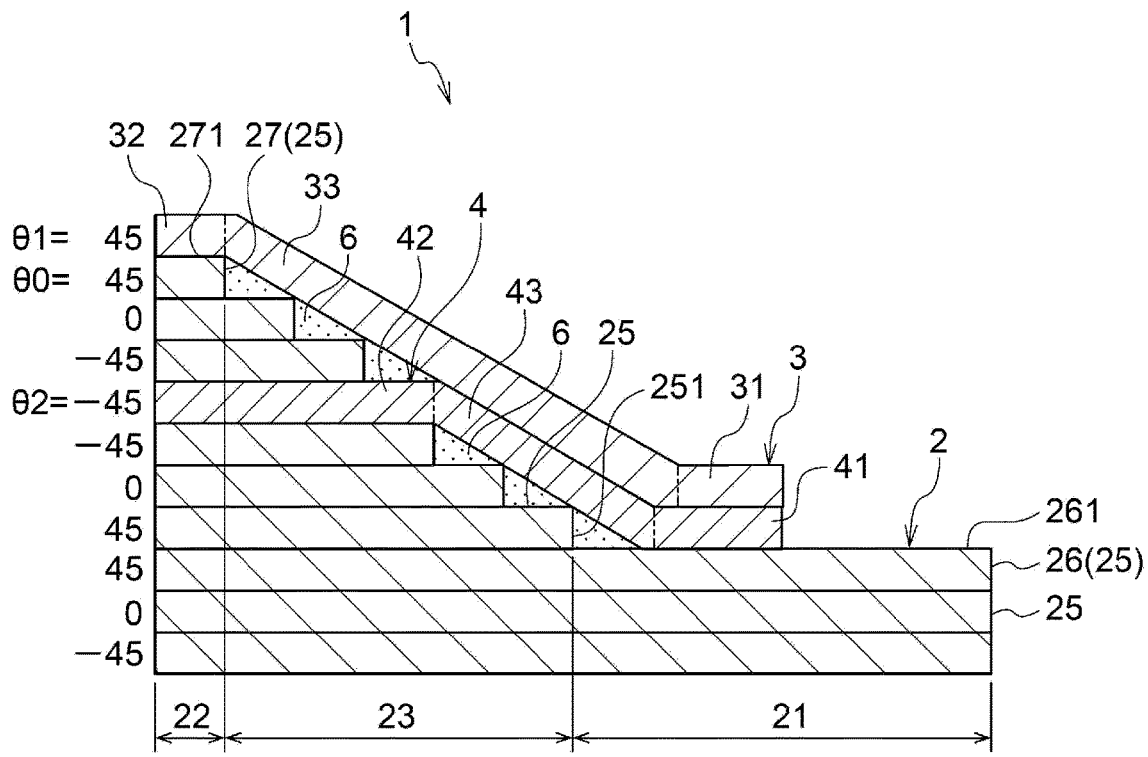
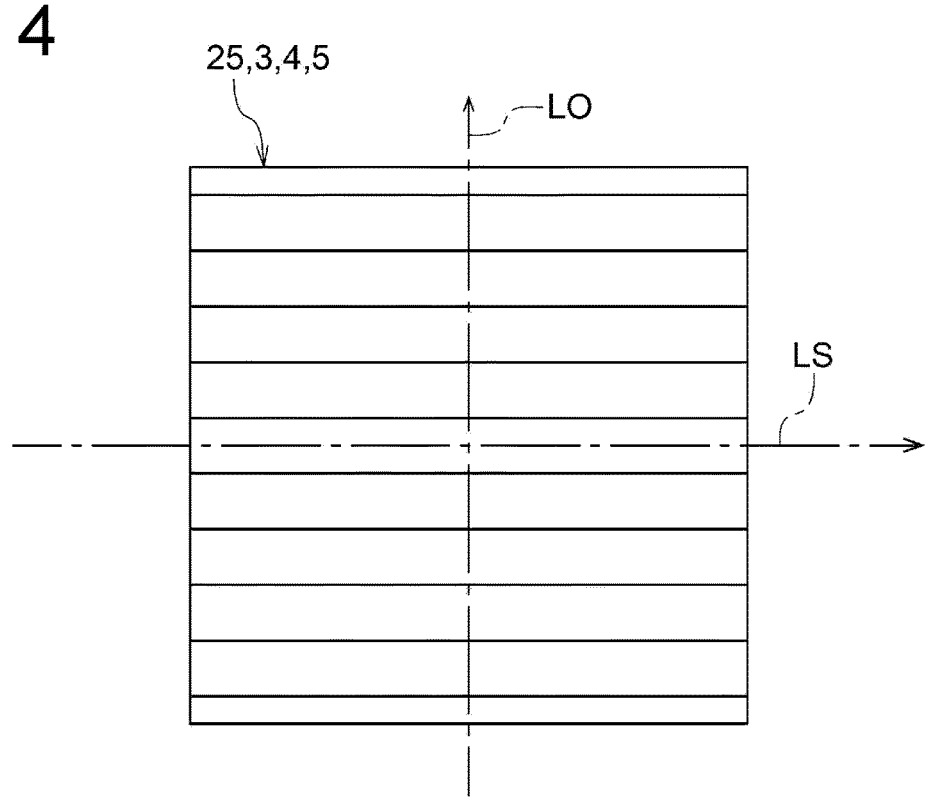

COMPOSITE STRUCTURE

TECHNICAL FIELD

The present disclosure relates to a composite structure which includes a stepped portion formed by laminating a plurality of plies with end surfaces thereof being shifted from each other.

BACKGROUND

A composite obtained by combining heterogeneous materials can gain a high specific strength which cannot be achieved with a single material and thus is used for, for example, a structural material or the like of an air plane. Patent Document 1 discloses that composite layers are laminated in a center portion where a pair of main wings and main wings of an air plane are connected, a thick portion is formed by laminating the composite layers, and the thick portion is generated gradually.

In addition, Patent Document 2 discloses a composite structure including a so-called plowing-in stepped portion. That is, FIG. 1 of Patent Document 2 discloses the composite structure in which the stepped portion is formed by arranging a plurality of sub plies between a plurality of main plies to be plowed therein. Each of the plurality of sub plies is smaller than each of the plurality of main plies. The plurality of main plies are laminated so as to cover entire skin. The end surfaces of the plurality of sub plies arranged between the main plies are shifted from each other, thereby forming the stepped portion.

CITATION LIST

Patent Literature

Patent Document 1: JP5184523B
Patent Document 2: JP6089036B

SUMMARY

Technical Problem

In general, as described in Patent Document 1, the stepped portion generated by laminating the composite layers (plies) to increase/decrease a strip thickness is designed to reduce a gradient inclination angle, that is, to moderately increase/decrease the strip thickness. The reason is that a stress is concentrated in the stepped portion if the gradient inclination angle of the stepped portion is large, which may result in delamination in a composite with a low strength in an interlayer direction.

However, an external dimension of each of the composite layers in the stepped portion increases, and thus a weight increases if the gradient inclination angle of the stepped portion is reduced in order to prevent delamination. Consequently, a problem arises in that it is impossible to achieve a weight reduction while taking advantage of the specific strength of the composite. The problem is particularly prominent in the composite structure which includes a so-called pat-type stepped portion in which a stepped portion is formed by laminating respective plies with end surfaces thereof being shifted from each other.

In view of the above issues, an object of at least one embodiment of the present invention is to provide the composite structure capable of preventing occurrence of delamination in the composite structure including the so-called pat-type stepped portion even if the gradient inclination angle of the stepped portion is large and capable of achieving the weight reduction.

Solution to Problem (1) A composite structure according to at least one embodiment of the present invention is a composite structure which includes a stepped portion formed by laminating a plurality of plies with end surfaces thereof being shifted from each other, the composite structure including a body portion which includes a first structure portion where a first ply of the plurality of plies is laminated on a top layer of the first structure portion, a second structure portion where a second ply of the plurality of plies is laminated on a top layer of the second structure portion, and the stepped portion disposed between the first structure portion and the second structure portion, the second ply being different from the first ply and positioned at a distance from the first ply in a lamination direction which is a direction where the plurality of plies are laminated, and a first cover ply which includes a covering portion covering the stepped portion, one end portion, and the other end portion and is formed so as to cover only a part of a surface of the first ply or a part of a surface of the second ply, the one end portion extending from one end part of the covering portion along a direction orthogonal to the lamination direction, the other end portion extending from the other end part of the covering portion along the direction orthogonal to the lamination direction.

With the above configuration (1), since the composite structure includes the first cover ply which includes the covering portion covering the stepped portion of the body portion, the one end portion extending from the one end part of the covering portion along the direction orthogonal to the lamination direction, and the other end portion extending from the other end part of the covering portion along the direction orthogonal to the lamination direction, it is possible to improve an interlayer strength in the stepped portion in the composite structure including a stepped portion of a so-called pad-up type. Since the interlayer strength in the stepped portion is improved, it is possible to prevent occurrence of delamination even if a gradient inclination angle of the stepped portion is large. Then, in a case in which the gradient inclination angle of the stepped portion is large, an extra thickness caused in the stepped portion can be reduced as compared with a case in which the inclination angle is small. Thus, it is possible to reduce the weight of the composite structure. In addition, since the first cover ply is formed so as to cover only the part of the surface of the first ply or the part of the surface of the second ply, it is possible to avoid occurrence of an extra portion in the first cover ply, and thus to reduce the weight of the composite structure. Such a first cover ply is not provided for the composite structure including the so-called plowing-in stepped portion described above. Furthermore, since the plurality of plies are laminated with end surfaces thereof being shifted from each other in the stepped portion of the pad-up type in the first place, the stepped portion itself has a predetermined interlayer strength.

(2) In some embodiments, in the above configuration (1), the composite structure further includes a second cover ply arranged between the first ply and the first cover ply in the lamination direction, and the second cover ply includes a covering portion covering the stepped portion, one end portion, and the other end portion, the one end portion extending from one end part of the covering portion along the direction orthogonal to the lamination direction, the other end portion extending from the other end part of the covering portion along the direction orthogonal to the lamination direction, and being interposed between two plies of the plurality of plies arranged between the first ply and the second ply in the lamination direction.

With the above configuration (2), it is possible to reduce a burden on the first cover ply by dispersing a part of a load applied to the first cover ply to be imposed on the second cover ply. Thus, it is possible to improve the interlayer strength in the stepped portion while preventing a destruction of the first cover ply.

(3) In some embodiments, in the above configuration (1) or (2), the first cover ply contains a reinforcement fiber having an orientation direction, and the orientation direction of the first cover ply intersects with a direction orthogonal to a reference line having the shortest distance between the first structure portion and the second structure portion as viewed from a top in the lamination direction.

With the above configuration (3), since the first cover ply contains the reinforcement fiber having the orientation direction, the reinforcement fiber can exert a great strength with respect to a load along the orientation direction. However, the reinforcement fiber may not be able to exert the great strength with respect to a load along a direction perpendicular to the orientation direction. Since the orientation direction of the first cover ply intersects with the straight line orthogonal to the reference line, the reinforcement fiber contained in the first cover ply can exert the great strength with respect to a load applied to the first cover ply. Thus, it is possible to improve the interlayer strength in the stepped portion.

(4) In some embodiments, in the above configuration (3), $\theta 1$ is in a range of $45\pm15°$ or $-45\pm15°$, where $\theta 1$ is an angle in the orientation direction of the first cover ply with respect to the reference line as viewed from the top in the lamination direction.

With the above configuration (4), since the angle $\theta 1$ in the orientation direction of the first cover ply with respect to the reference line (the straight line passing through the position at which the gradient of the stepped portion is maximum) is in the range of $45\pm15°$ or $-45\pm15°$, the reinforcement fiber contained in the first cover ply can exert the great strength with respect to both of a load along the reference line and a load along the straight line orthogonal to the reference line. Thus, it is possible to improve the interlayer strength in the stepped portion.

(5) In some embodiments, in the above configuration (3), $\theta 1$ is in a range of $0\pm15°$, where $\theta 1$ is an angle in the orientation direction of the first cover ply with respect to the reference line as viewed from the top in the lamination direction.

With the above configuration (5), since the angle $\theta 1$ in the orientation direction of the first cover ply with respect to the reference line (the straight line passing through the position at which the gradient of the stepped portion is maximum) is in the range of $0\pm15°$, the load along the reference line is easily transferred to the first cover ply, making it possible to prevent a stress in the interlayer direction from concentrating in the stepped portion. Thus, it is possible to improve the interlayer strength in the stepped portion.

(6) In some embodiments, in any one of the above configurations (3) to (5), the composite structure further includes a third cover ply arranged on a side opposite to the first ply with respect to the first cover ply in the lamination direction.

With the above configuration (6), the composite structure further includes the third cover ply arranged on the side opposite to the first ply with respect to the first cover ply. Therefore, it is possible to disperse the part of the load applied to the first cover ply to be imposed on the third cover ply, and thus to reduce the burden on the first cover ply. Thus, it is possible to improve the interlayer strength in the stepped portion while preventing the destruction of the first cover ply.

(7) In some embodiments, in the above configuration (6), the third cover ply contains the reinforcement fiber having the orientation direction, and a relation of $\theta 3=-\theta 1$ is satisfied, where $\theta 1$ is an angle in the orientation direction of the first cover ply with respect to the reference line, and $\theta 3$ is an angle in the orientation direction of the third cover ply with respect to the reference line as viewed from the top in the lamination direction.

With the above configuration (7), since the third cover ply contains the reinforcement fiber having the orientation direction, the reinforcement fiber can exert the great strength with respect to the load along the orientation direction. Moreover, since the angle $\theta 3$ in the orientation direction of the third cover ply with respect to the reference line satisfies the relation of $\theta 3=-\theta 1$, it is possible to reduce an influence by anisotropy of the first cover ply and the third cover ply, and the reinforcement fiber contained in the first cover ply and the third cover ply can exert the great strength regardless of an application direction of a load. Thus, it is possible to improve the interlayer strength in the stepped portion.

(8) In some embodiments, in the above configuration (1) to (7), the covering portion of the first cover ply includes a first covering portion continuing to the one end portion of the first cover ply and has an obliquity with respect to the one end portion as viewed from a cross-section along the lamination direction, and a second covering portion continuing to the other end portion of the first cover ply and has an obliquity with respect to the other end portion as viewed from the cross-section along the lamination direction, and the obliquity with respect to the one end portion of the first covering portion is formed more gently than the obliquity with respect to the other end portion of the second covering portion.

With the above configuration (8), the first covering portion continuing to the one end portion of the first cover ply has the higher degree of stress concentration than the second covering portion continuing to the other end portion. However, since the obliquity with respect to the one end portion of the first covering portion is formed more gently than the obliquity with respect to the other end portion of the second covering portion, it is possible to improve the interlayer strength in the stepped portion while preventing a destruction in the first covering portion of the first cover ply.

(9) In some embodiments, in the above configuration (1) to (8), in the stepped portion, provided that H is a horizontal distance, and V is a vertical distance, a ratio H/V of the horizontal distance to the vertical distance is in a range of $1\leq H/V<30$.

With the above configuration (9), it is possible to prevent occurrence of delamination by the first cover ply even if the gradient inclination angle is large as in the case in which the ratio H/V of the horizontal distance to the vertical distance in the stepped portion is in the above-described range.

(10) In some embodiments, in the above configuration (1) to (9), the first cover ply is formed so as to cover over an entire surface of the stepped portion as viewed from a top in the lamination direction.

With the above configuration (10), it is possible to improve the interlayer strength in the stepped portion as compared with a case in which the first cover ply covers only a part of the stepped portion as viewed from the top in the lamination direction.

(11) In some embodiments, in the above configuration (1) to (9), the first cover ply is formed so as to cover only a part of the stepped portion as viewed from a top in the lamination direction.

With the above configuration (11), it is possible to improve the interlayer strength in the stepped portion and to avoid occurrence of the extra portion in the first cover ply. Thus, it is possible to reduce the weight of the composite structure.

Advantageous Effects

According to at least one embodiment of the present invention, a composite structure is provided, which is capable of preventing occurrence of delamination in a composite structure including a so-called pat-type stepped portion even if a gradient inclination angle of the stepped portion is large, is capable of preventing occurrence of delamination even if the gradient inclination angle of the stepped portion is large, which allows a weight reduction, and is capable of achieving the weight reduction.

BRIEF DESCRIPTION OF DRAWINGS

FIG. 3 is a schematic cross-sectional view taken along line A-A shown in FIG. 2 and is a view showing the configuration of the composite structure according to an embodiment.

FIG. 4 is a view for describing an orientation direction of plies and showing a state of θ=0° according to an embodiment.

DETAILED DESCRIPTION

Embodiments of the present invention will now be described in detail with reference to the accompanying drawings. It is intended, however, that unless particularly identified, dimensions, materials, shapes, relative positions and the like of components described in the embodiments shall be interpreted as illustrative only and not intended to limit the scope of the present invention.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same", "equal", and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

Figure 1:
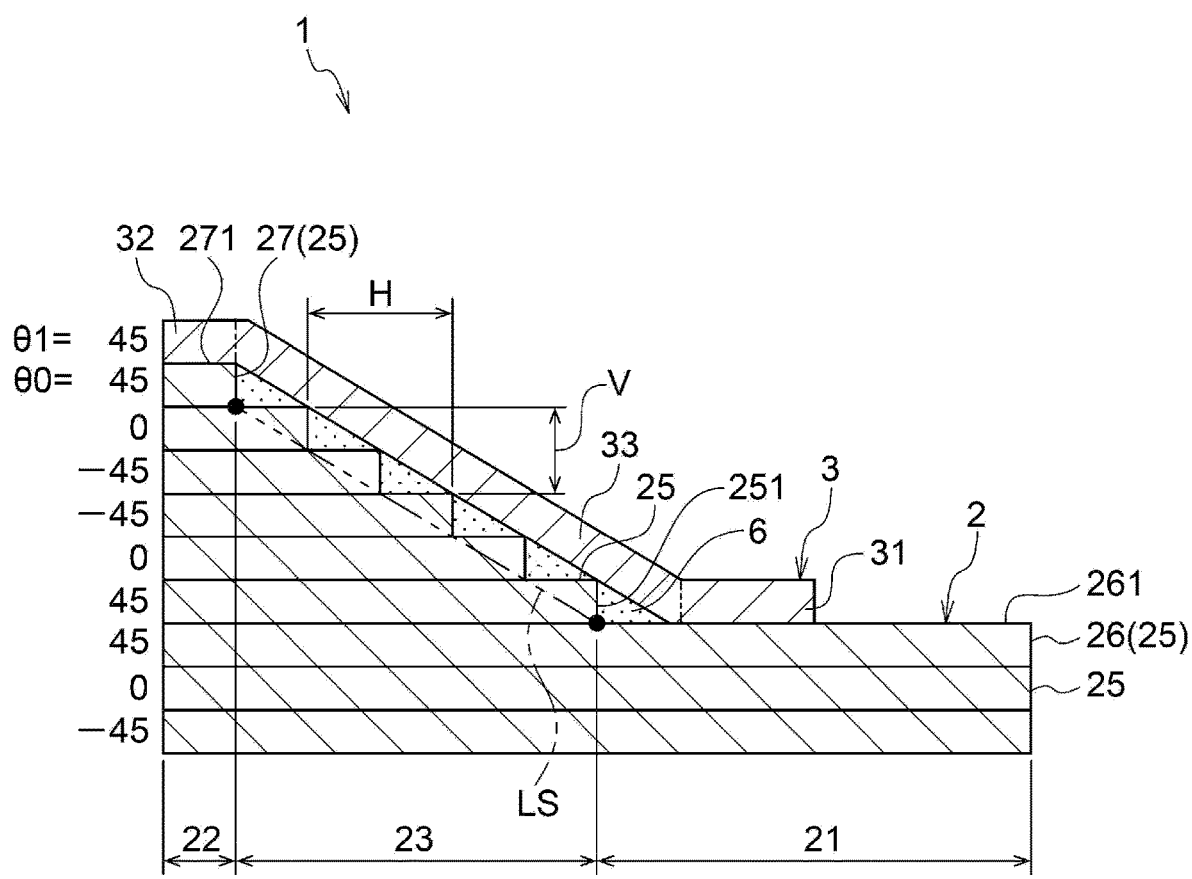
FIG. 1 is a view for describing the configuration of a composite structure and is a schematic cross-sectional view taken along line A-A shown in FIG. 2 according to an embodiment of the present invention.
Figure 2:
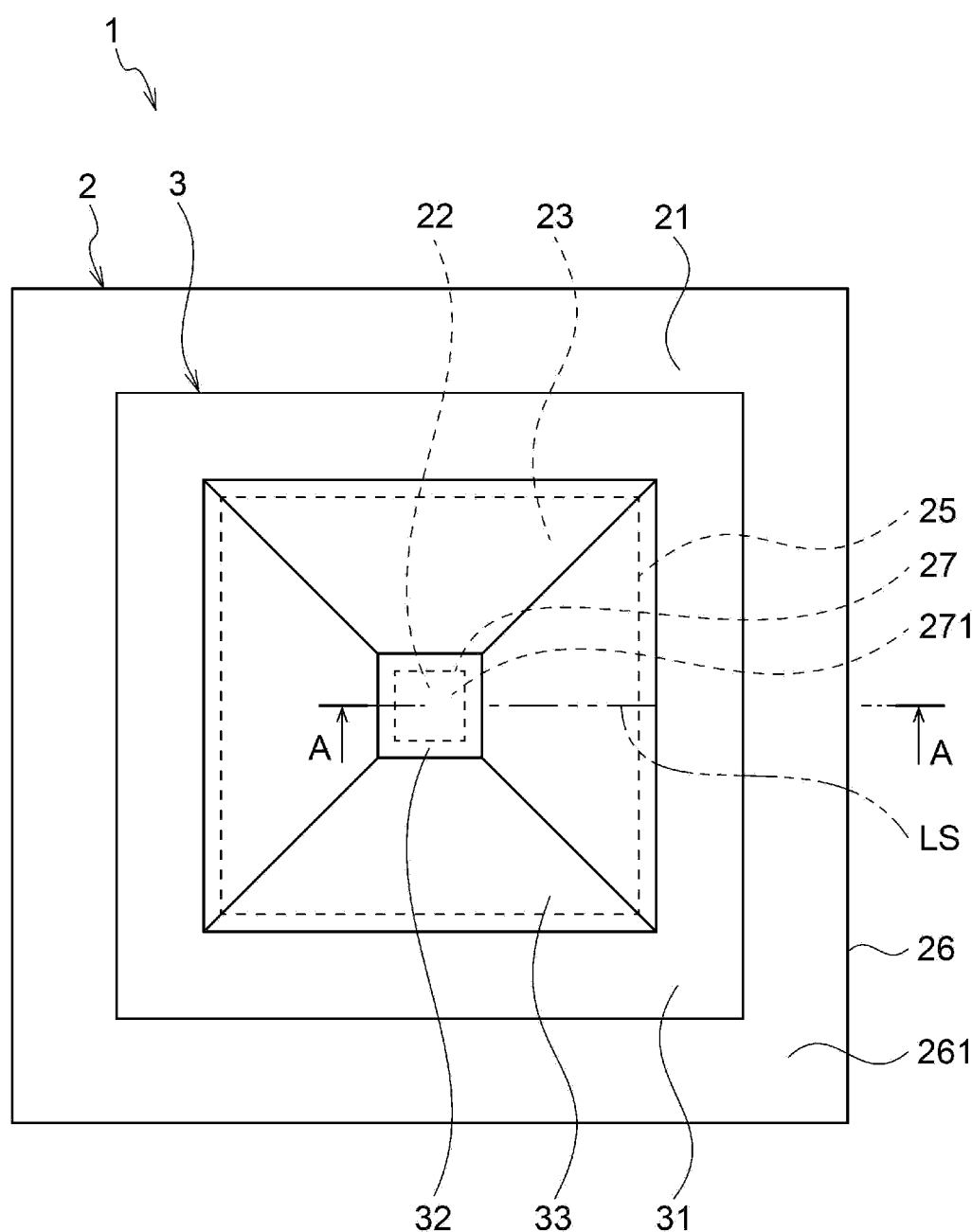
FIG. 2 is a schematic top view of the composite structure in a lamination direction as viewed from the top according to an embodiment of the present invention.

FIG. 1 is a view for describing the configuration of a composite structure and is a schematic cross-sectional view taken along line A-A shown in FIG. 2 according to an embodiment of the present invention. FIG. 2 is a schematic top view of the composite structure in a lamination direction as viewed from the top according to an embodiment of the present invention. Numerals are shown on the left side of FIG. 1 and FIGS. 3, 7, 8 to be described later. The numerals indicate angles (°) in the orientation direction of a reinforcement fiber with respect to a reference line LS (see FIGS. 4 to 6) to be described later. The reinforcement fiber is contained in each of plies 25, a first cover ply 3, a second cover ply 4, and a third cover ply 5.

As shown in FIG. 1, a composite structure 1 according to some embodiments includes a stepped portion 23 formed by laminating the plurality of plies 25 with end surfaces 251 thereof being shifted from each other. As shown in FIG. 1, the composite structure 1 includes a body portion 2 and the first cover ply 3.

As shown in FIGS. 1, 2, the body portion 2 includes the stepped portion 23 disposed between two plies 25 (a first ply 26, a second ply 27) of the plurality of plies 25 positioned at a distance from one another in the lamination direction (a direction from a lower side toward an upper side in FIG. 1, and a direction from a far side toward a near side in FIG. 2). More specifically, as shown in FIG. 1, the body portion 2 includes a first structure portion 21, a second structure portion 22, and the stepped portion 23. In the first structure portion 21, the first ply 26 of the plurality of plies 25 is laminated on a top layer of the first structure portion 21. In the second structure portion 22, the second ply 27 of the plurality of plies 25 which is different from the first ply 26 is laminated on a top layer of the second structure portion 22.

The stepped portion 23 is disposed between the first structure portion 21 and the second structure portion 22. The second ply 27 is positioned at a distance from the first ply 26 in the lamination direction. In other words, the second ply 27 is laminated on an upper layer of the first ply 26. The composite structure 1 satisfies an in-plane strength required on a design only by the body portion 2. Moreover, the plurality of plies 25 are each contain the reinforcement fiber having the orientation direction along a direction orthogonal to the lamination direction, and contain a fiber-reinforced plastic whose strength is improved by putting a reinforcing fiber such as a carbon fiber in a thermosetting resin (plastic) such as an epoxy resin serving as a base material.

In the embodiment shown in FIG. 1, the body portion 2 is of a so-called lamination type (pad-up type) in which both of the plurality of plies 25 arranged between the first ply 26 and the second ply 27, and the second ply 27 are laminated on the first ply 26 and extend along a direction orthogonal to the lamination direction, and the respective end surfaces 251 are laminated while being shifted from each other. In addition, as shown in FIG. 1, the first ply 26 and the plurality of plies 25 positioned on a side opposite to the second ply 27 with respect to the first ply 26 of the body portion 2 extend along the direction orthogonal to the lamination direction. The first ply 26 and the plurality of plies 25 positioned on the side opposite to the second ply 27 with respect to the first ply 26 of the body portion 2 may be of the plowing-in type described above. Furthermore, the plurality of plies 25, the first ply 26, and the second ply 27 may each have a curved shape so as to follow, for example, a contour shape of another component.

As shown in FIG. 1, the first cover ply 3 includes a covering portion 33, one end portion 31, and the other end portion 32. The covering portion 33 covers the stepped portion 23 of the body portion 2. The one end portion 31 extends from one end part of the covering portion 33 positioned on the side of the first structure portion 21 along the direction orthogonal to the lamination direction. The other end portion 32 extends from the other end part of the covering portion 33 positioned on the side of the second structure portion 22 along the direction orthogonal to the lamination direction. In FIG. 1 and FIGS. 3, 7, 8 to be described later, the one end portion 31, the covering portion 33, and the other end portion 32 are shown separately by double-dotted chain lines for the sake of descriptive convenience. However, the one end portion 31, the covering portion 33, and the other end portion 32 are disposed integrally.

Figure 9:
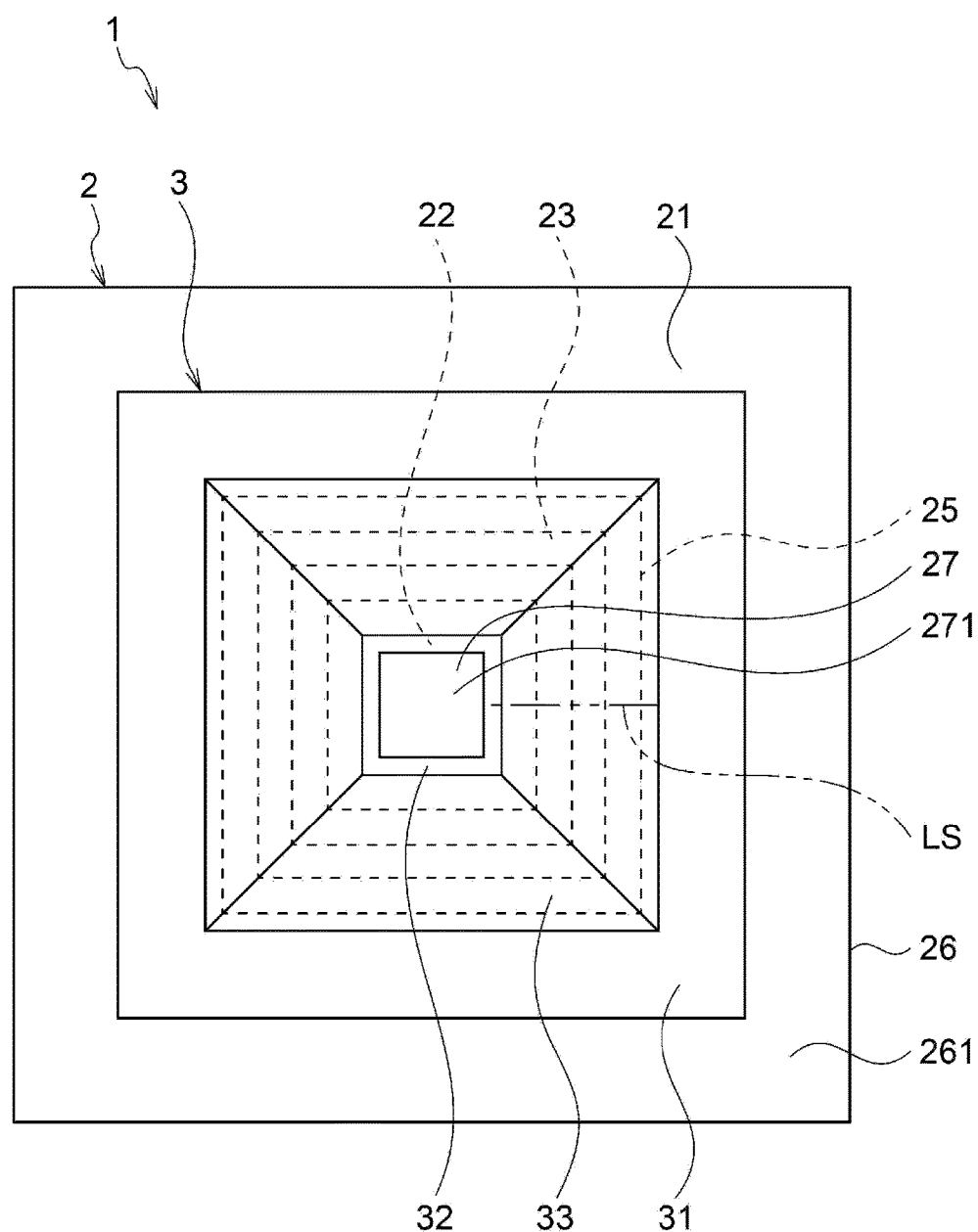
FIG. 9 is a schematic top view of the composite structure in the lamination direction as viewed from the top according to another embodiment of the present invention.
Figure 10:
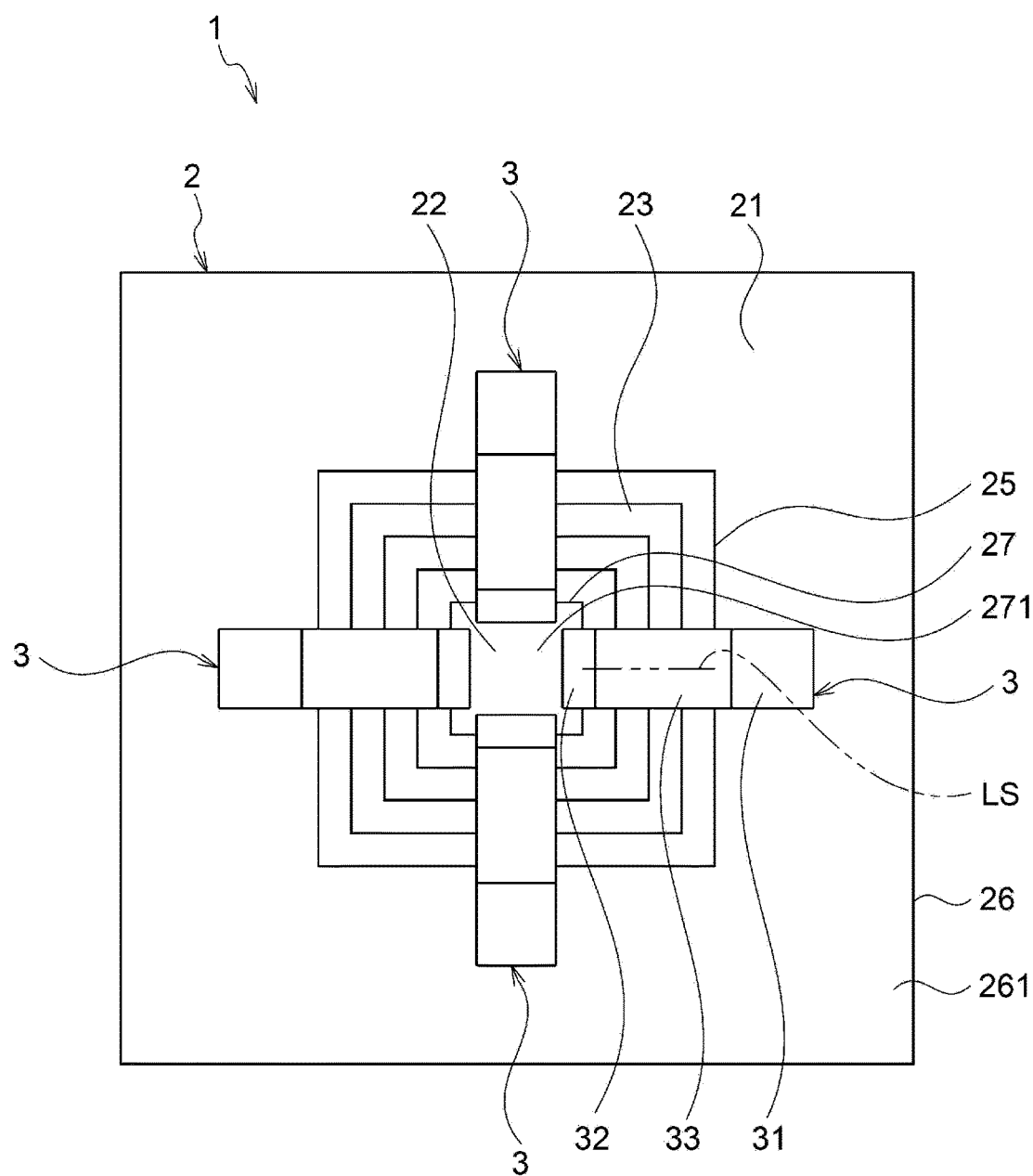
FIG. 10 is a schematic top view of the composite structure in the lamination direction as viewed from the top according to another embodiment of the present invention.

In the embodiment shown in FIG. 1, the first cover ply 3 is formed so as to cover a surface 261 of the first ply 26 not entirely but only partially as viewed from the top in the lamination direction, as shown in FIG. 2. In the embodiment shown in FIG. 1, the first cover ply 3 is formed so as to cover a surface 271 of the second ply 27 entirely as viewed from the top in the lamination direction, as shown in FIG. 2. However, the first cover ply 3 may be formed so as to cover the surface 271 of the second ply 27 only partially as shown in FIGS. 9 and 10 to be described later. Moreover, the first cover ply 3 is formed by the same material as the plurality of plies 25 and contains the fiber-reinforced plastic whose strength is improved by putting the reinforcing fiber such as the carbon fiber in the thermosetting resin (plastic) such as the epoxy resin serving as the base material (a material enclosing the reinforcing fiber).

In the embodiment shown in FIG. 1, the one end portion 31 of the first cover ply 3 is firmly fixed onto the surface 261 of the first ply 26 by heating and pressurizing the thermosetting resin contained in the first cover ply 3 to be softened into a fluidized state, and then further continuing heating the thermosetting resin to be hardened while being directly laminated on the first ply 26. Similarly, the other end portion 32 of the first cover ply 3 is firmly fixed to the surface 271 of the second ply 27 while being directly laminated on the second ply 27. The thermosetting resin contained in the first cover ply 3 is eluted from the first cover ply 3 when heated and pressurized as described above (eluted resin 6), thereby filling triangle-shaped gaps in FIG. 1 formed between the covering portion 33 of the first cover ply 3 and the stepped portion 23 of the body portion 2. Thus, the covering portion 33 of the first cover ply 3 and the stepped portion 23 of the body portion 2 are firmly fixed. Moreover, as shown in FIG. 1, the covering portion 33 of the first cover ply 3 is formed so as to bend from each of the one end portion 31 and the other end portion 32, and is formed into a shape along a gradient of the stepped portion 23 of the body portion 2. The covering portion 33 of the first cover ply 3 is formed linearly in FIG. 1. However, the covering portion 33 may be formed into a staircase shape along the stepped portion 23 of the body portion 2. The composite structure 1 can improve an interlayer strength in the stepped portion 23 with the first cover ply 3 even if the interlayer strength in the stepped portion 23 is insufficient only by the body portion 2.

The gradient of the stepped portion 23 is represented by a ratio H/V of a horizontal distance H to a vertical distance V between the two plies 25 of the plurality of plies 25 laminated in the stepped portion 23, as shown in FIG. 1. The gradient inclination angle of the stepped portion 23 increases as the value of H/V decreases. As an example, the value of H/V is not less than 30 in a case in which the gradient inclination angle of the stepped portion 23 is designed to be gentle.

By contrast, in some embodiments, in the stepped portion 23, the ratio H/V of the horizontal distance H to the vertical distance V is in a range of $1 \leq H/V < 30$. Preferably, H/V is in a range of $2 \leq H/V \leq 20$. More preferably, H/V is in a range of $3 \leq H/V \leq 10$. It is possible to prevent occurrence of delamination by the first cover ply 3 even if the ratio H/V of the horizontal distance H to the vertical distance V in the stepped portion 23 is in the above-described range.

As described above, the composite structure 1 according to some embodiments includes the above-described body portion 2 and the above-described first cover ply 3.

With the above configuration, since the composite structure 1 includes the first cover ply 3 which includes the covering portion 33 covering the stepped portion 23 of the body portion 2, the one end portion 31 extending from the one end part of the covering portion 33 along the direction orthogonal to the lamination direction, and the other end portion 32 extending from the other end part of the covering portion 33 along the direction orthogonal to the lamination direction, it is possible to improve the interlayer strength in the stepped portion 23 in the composite structure 1 including the stepped portion 23 of the so-called pad-up type. Since the interlayer strength in the stepped portion 23 is improved, it is possible to prevent occurrence of delamination even if the gradient inclination angle of the stepped portion 23 is large. Then, in a case in which the gradient inclination angle of the stepped portion 23 is large, an extra thickness caused in the stepped portion 23 can be reduced as compared with a case in which the inclination angle is small. Thus, it is possible to reduce the weight of the composite structure 1. In addition, since the first cover ply 3 is formed so as to cover only a part of the surface 261 of the first ply 26 or a part of the surface 271 of the second ply 27, it is possible to avoid occurrence of an extra portion in the first cover ply 3, and thus to reduce the weight of the composite structure 1. Such a first cover ply 3 is not provided for the composite structure including the so-called plowing-in stepped portion described above. Furthermore, since the plurality of plies 25 are laminated with end surfaces 251 thereof being shifted from each other in the stepped portion 23 of the pad-up type in the first place, the stepped portion 23 itself has a predetermined interlayer strength.

In some embodiments, as shown in FIG. 3, the composite structure 1 further includes the second cover ply 4. FIG. 3 is a schematic cross-sectional view taken along line A-A shown in FIG. 2 and is a view showing the configuration of the composite structure according to an embodiment. As shown in FIG. 3, the second cover ply 4 is arranged between the first ply 26 and the first cover ply 3 of the body portion 2 in the lamination direction. The second cover ply 4 includes a covering portion 43, one end portion 41, and the other end portion 42. The covering portion 43 covers the stepped portion 23 of the body portion 2. The one end portion 41 extends from one end part of the covering portion 43 positioned on the side of the first structure portion 21 along the direction orthogonal to the lamination direction. The other end portion 42 extends from the other end part of the covering portion 43 positioned on the side of the second structure portion 22 along the direction orthogonal to the lamination direction. In FIG. 3, the one end portion 41, the covering portion 43, and the other end portion 42 are shown separately by double-dotted chain lines for the sake of descriptive convenience. However, the one end portion 41, the covering portion 43, and the other end portion 42 are disposed integrally. Moreover, the second cover ply 4 is formed by the same material as the plurality of plies 25 and contains the fiber-reinforced plastic whose strength is improved by putting the reinforcing fiber such as the carbon fiber in the thermosetting resin (plastic) such as the epoxy resin serving as the base material.

In the embodiment shown in FIG. 3, the one end portion 41 of the second cover ply 4 is firmly fixed onto the surface 261 of the first ply 26 by heating and pressurizing the thermosetting resin contained in the second cover ply 4 to be softened into a fluidized state, and then further continuing heating the thermosetting resin to be hardened while being directly laminated on the first ply 26. Moreover, the one end portion 31 of the first cover ply 3 is indirectly laminated on the first ply 26. That is, the one end portion 31 of the first cover ply 3 is firmly fixed onto the one end portion 41 of the second cover ply 4 by the thermosetting resin contained in the first cover ply 3 or the second cover ply 4. The one end portion 31 of the first cover ply 3 may firmly be fixed onto the surface 261 of the first ply 26.

The other end portion 42 of the second cover ply 4 is firmly fixed to the two plies 25 of the plurality of plies 25 arranged between the first ply 26 and the second ply 27 in the lamination direction by heating and pressurizing the thermosetting resin contained in the second cover ply 4 to be softened into a fluidized state, and then further continuing heating the thermosetting resin to be hardened while being interposed between the two plies 25. Similarly to the thermosetting resin contained in the first cover ply 3 described above, the thermosetting resin contained in the second cover ply 4 is eluted from the second cover ply 4 when heated and pressurized as described above (eluted resin 6), thereby filling triangle-shaped gaps in FIG. 3 formed between the covering portion 43 of the second cover ply 4 and the stepped portion 23 of the body portion 2. Thus, the covering portion 43 of the second cover ply 4 and the stepped portion 23 of the body portion 2 are firmly fixed. Further, the covering portion 33 of the first cover ply 3 is fixed to not only the stepped portion 23 of the body portion 2 but the covering portion 43 of the second cover ply 4 so as not to generate gaps between itself and the covering portion 43 of the second cover ply 4. Moreover, as shown in FIG. 3, the covering portion 43 of the second cover ply 4 is formed so as to bend from each of the one end portion 41 and the other end portion 42, and is formed into a shape along the gradient of the stepped portion 23 of the body portion 2. The covering portion 43 of the second cover ply 4 is formed linearly in FIG. 3. However, the covering portion 43 may be formed into a staircase shape along the stepped portion 23 of the body portion 2. In the embodiment shown in FIG. 3, the composite structure 1 includes the one second cover ply 4. However, the composite structure 1 may include the plurality of second cover plies 4.

With the above configuration, it is possible to reduce a burden on the first cover ply 3 by dispersing a part of a load applied to the first cover ply 3 to be imposed on the second cover ply 4. Thus, it is possible to improve the interlayer strength in the stepped portion 23 while preventing a destruction of the first cover ply 3.

Figure 5:
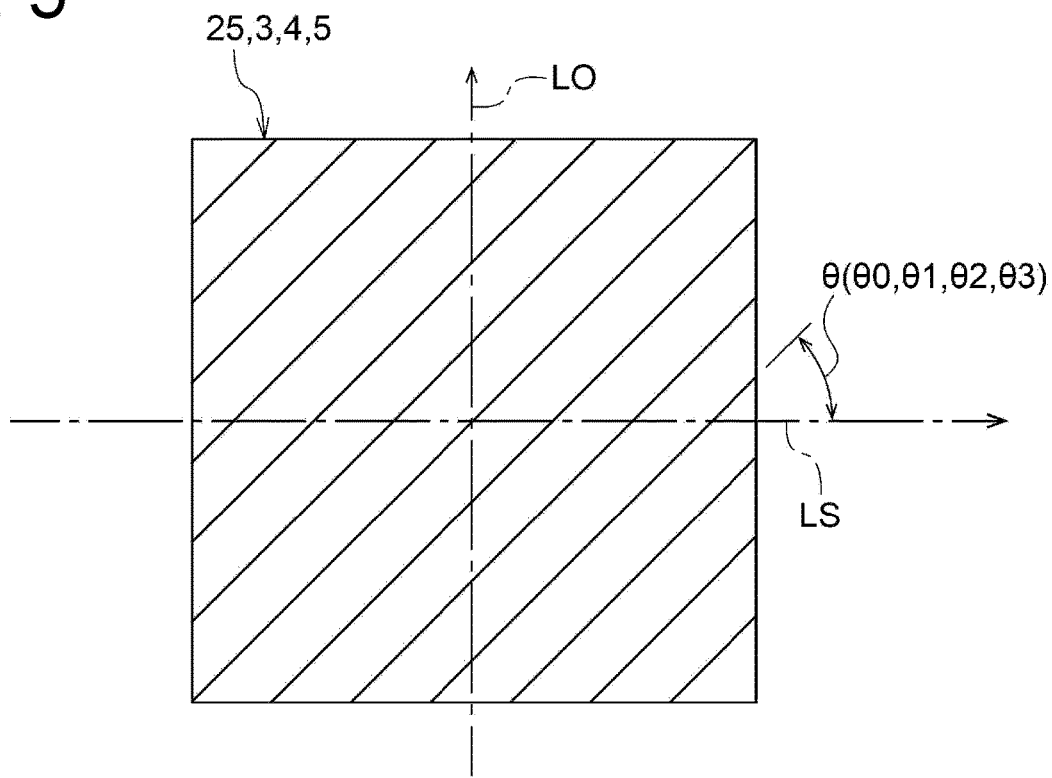
FIG. 5 is a view for describing the orientation direction of the plies and showing a state of θ=45° according to an embodiment.
Figure 6:
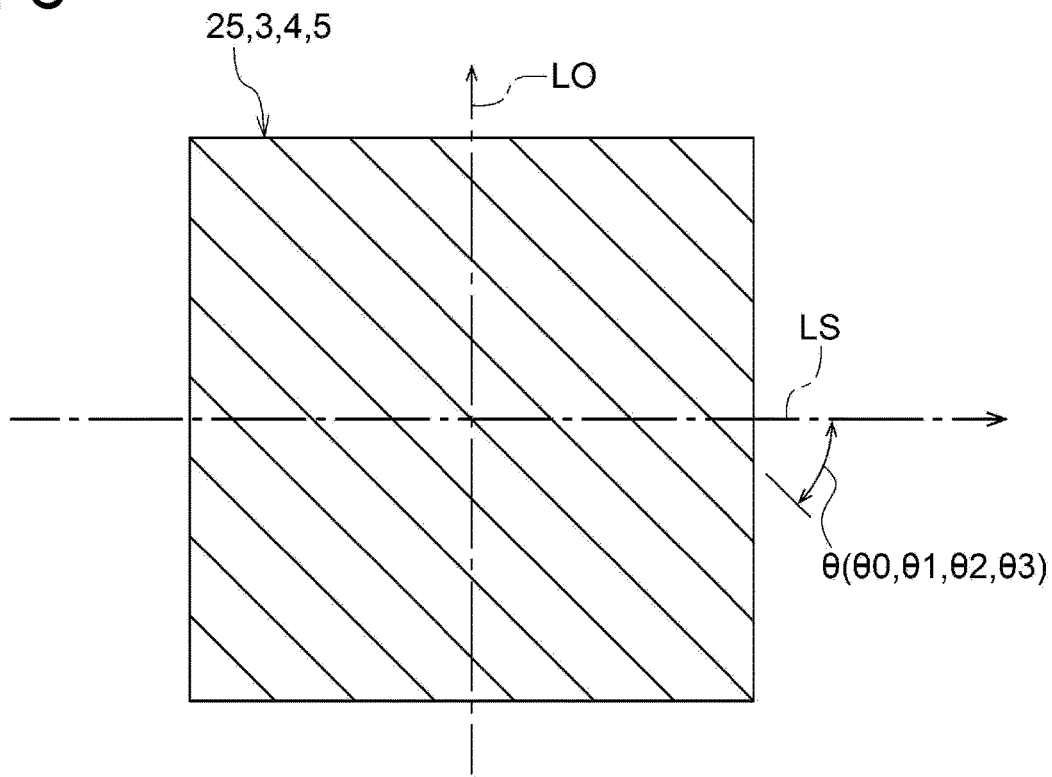
FIG. 6 is a view for describing the orientation direction of the plies and showing a state of θ=−45° according to an embodiment.

FIGS. 4 to 6 are views for each describing the orientation direction of the plies (the plies 25, the first cover ply 3, the second cover ply 4, and the third cover ply 5) according to an embodiment. As shown in FIG. 1, a straight line having the shortest distance between the first structure portion 21 and the second structure portion 22 of the body portion 2 is referred to as the reference line LS. As shown in FIG. 2, the reference line LS is a straight line passing through a position at which the gradient of the stepped portion 23 is maximum as viewed from the top in the lamination direction. Furthermore, as shown in FIGS. 4 to 6, a straight line orthogonal to the reference line LS as viewed from the top in the lamination direction of the plurality of plies 25 is referred to as an orthogonal line LO. Moreover, θ is an angle in the orientation direction of the plies with respect to the reference line LS as viewed from the top in the lamination direction. Regarding θ, an anticlockwise direction from the reference line LS is positive, and a clockwise direction is negative in FIGS. 4 to 6 for the sake of descriptive convenience. FIG. 4 is a view showing a state of θ=0°, FIG. 5 is a view showing a state of θ=45°, and FIG. 6 is a view showing a state of θ=−45°. Moreover, θ0 is an angle in the orientation direction of the plies 25 with respect to the reference line LS.

In some embodiments, the first cover ply 3 contains the reinforcement fiber having the orientation direction along the direction orthogonal to the lamination direction as shown in FIGS. 4 to 6. As exemplified in FIGS. 4 to 6, the orientation direction of the first cover ply 3 intersects with the orthogonal line LO as viewed from the top in the lamination direction.

With the above configuration, since the first cover ply 3 contains the reinforcement fiber having the orientation direction, the reinforcement fiber can exert a great strength with respect to a load along the orientation direction. However, the reinforcement fiber may not be able to exert the great strength with respect to a load along a direction perpendicular to the orientation direction. Since the orientation direction of the first cover ply 3 intersects with the straight line orthogonal to the reference line LS (orthogonal line LO), the reinforcement fiber contained in the first cover ply 3 can exert the great strength with respect to a load applied to the first cover ply 3. Thus, it is possible to improve the interlayer strength in the stepped portion 23.

In some embodiments described above, as the orientation direction of the first cover ply 3, a direction along the orthogonal line LO is excluded. However, in some other embodiments, the orientation direction of the first cover ply 3 may be the direction along the orthogonal line LO, or the orientation directions of the plies 25, the second cover ply 4, and the third cover ply 5 may be the directions along the orthogonal line LO.

As exemplified in FIGS. 1, 3, 5 to 8, in some embodiments, θ1 is in the range of 45±15° or −45±15°, where θ1 is an angle in the orientation direction of the first cover ply 3 with respect to the reference line LS as viewed from the top in the lamination direction. With the above configuration, since the angle θ1 in the orientation direction of the first cover ply 3 with respect to the reference line LS (the straight line passing through the position at which the gradient of the stepped portion 23 is maximum) is in the range of 45±15° or −45±15°, the reinforcement fiber contained in the first cover ply 3 can exert the great strength with respect to both of a load along the reference line LS and a load along the straight line orthogonal to the reference line LS (orthogonal line LO). Thus, it is possible to improve the interlayer strength in the stepped portion 23.

As exemplified in FIG. 4, in some embodiments, θ1 is in the range of 0±15°, where θ1 is the angle in the orientation direction of the first cover ply 3 with respect to the reference line LS as viewed from the top in the lamination direction. With the above configuration, since the angle θ1 in the orientation direction of the first cover ply 3 with respect to the reference line LS (the straight line passing through the position at which the gradient of the stepped portion 23 is maximum) is in the range of 0±15°, the load along the reference line LS is easily transferred to the first cover ply 3, making it possible to prevent a stress in the interlayer direction from concentrating in the stepped portion 23. Thus, it is possible to improve the interlayer strength in the stepped portion 23.

Figure 7:
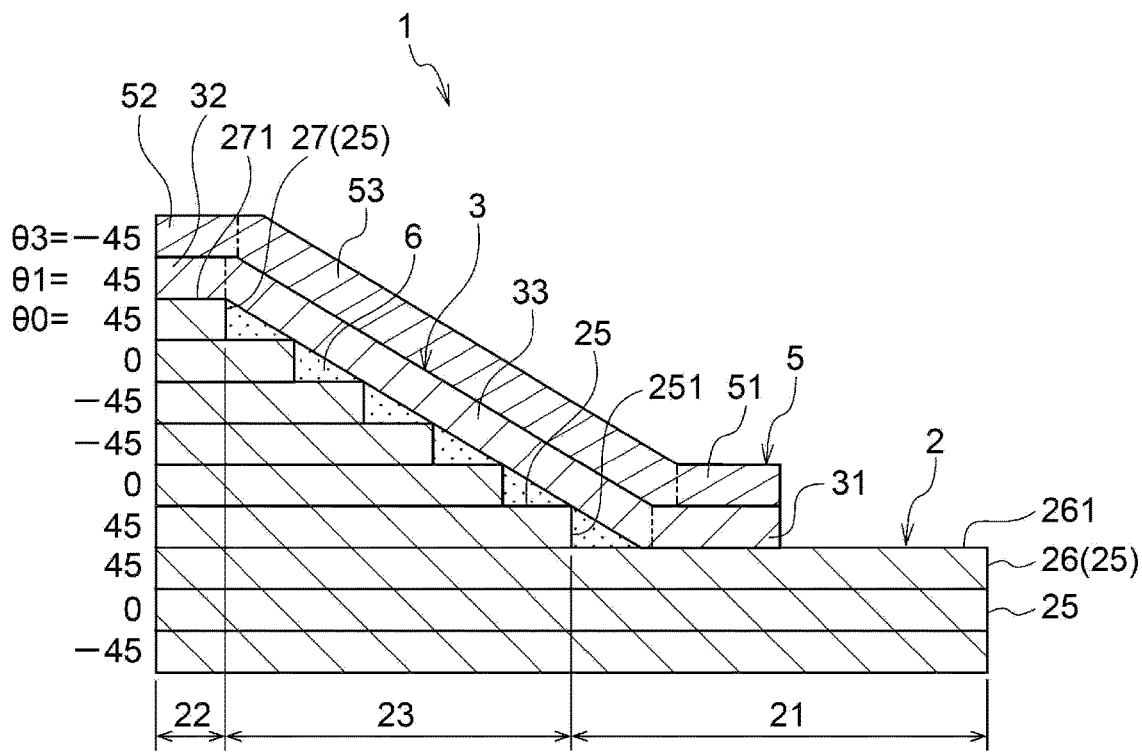
FIG. 7 is a schematic cross-sectional view corresponding to a cross-sectional view taken along line A-A shown in FIG. 2 and is a view showing the configuration of the composite structure according to an embodiment.

In some embodiments, as shown in FIG. 7, the composite structure 1 further includes the third cover ply 5. FIG. 7 is a schematic cross-sectional view corresponding to a cross-sectional view taken along line A-A shown in FIG. 2 and is a view showing the configuration of the composite structure according to an embodiment. As shown in FIG. 7, the third cover ply 5 is arranged on a side opposite to the first ply 26 with respect to the first cover ply 3 in the lamination direction.

In the embodiment shown in FIG. 7, the third cover ply 5 is directly laminated on the first cover ply 3. More specifically, as shown in FIG. 7, the third cover ply 5 includes a covering portion 53, one end portion 51, and the other end portion 52. The covering portion 53 covers the stepped portion 23 of the body portion 2 from the outside of the covering portion 33 of the first cover ply 3. The one end portion 51 extends from one end part of the covering portion 53 positioned on the side of the first structure portion 21 along the direction orthogonal to the lamination direction. The other end portion 52 extends from the other end part of the covering portion 53 positioned on the side of the second structure portion 22 along the direction orthogonal to the lamination direction. In FIG. 7, the one end portion 51, the covering portion 53, and the other end portion 52 are shown separately by double-dotted chain lines for the sake of descriptive convenience. However, the one end portion 51, the covering portion 53, and the other end portion 52 are disposed integrally. Moreover, the third cover ply 5 is formed by the same material as the plurality of plies 25 and contains the fiber-reinforced plastic whose strength is improved by putting the reinforcing fiber such as the carbon fiber in the thermosetting resin (plastic) such as the epoxy resin serving as the base material.

As shown in FIG. 7, the one end portion 51 of the third cover ply 5 is firmly fixed to the one end portion 31 of the first cover ply 3 by heating and pressurizing the thermosetting resin contained in the third cover ply 5 to be softened into a fluidized state, and then further continuing heating the thermosetting resin to be hardened while being directly laminated on the one end portion 31 of the first cover ply 3. Similarly, the other end portion 52 of the third cover ply 5 is firmly fixed to the other end portion 32 of the first cover ply 3 while being directly laminated on the other end portion 32 of the first cover ply 3. Further, the covering portion 53 of the third cover ply 5 is fixed to the covering portion 33 of the first cover ply 3 while being directly laminated on the covering portion 33 of the first cover ply 3 so as not to generate gaps between itself and the covering portion 33 of the first cover ply 3. The one end portion 51 of the third cover ply 5 may firmly be fixed onto the surface 261 of the first ply 26, or the other end portion 52 of the third cover ply 5 may firmly be fixed onto the surface 271 of the second ply 27. Moreover, as shown in FIG. 7, the covering portion 53 of the third cover ply 5 is formed so as to bend from each of the one end portion 51 and the other end portion 52, and is formed into a shape along the gradient of the stepped portion 23 of the body portion 2. The covering portion 53 of the third cover ply 5 is formed linearly in FIG. 7. However, the covering portion 53 may be formed into a staircase shape along the stepped portion 23 of the body portion 2.

With the above configuration, the composite structure 1 further includes the third cover ply 5 arranged on the side opposite to the first ply 26 with respect to the first cover ply 3. Therefore, it is possible to disperse the part of the load applied to the first cover ply 3 to be imposed on the third cover ply 5, and thus to reduce the burden on the first cover ply 3. Thus, it is possible to improve the interlayer strength in the stepped portion 23 while preventing the destruction of the first cover ply 3.

In some embodiments, similarly to the first cover ply 3, the above-described third cover ply 5 contains the reinforcement fiber having the orientation direction. A relation of θ3=−θ1 is satisfied, where θ3 is an angle in the orientation direction of the third cover ply 5 with respect to the reference line LS as viewed from the top in the lamination direction. For example, in a case in which the angle θ1 in the orientation direction of the first cover ply 3 is in the state of θ1=45° as shown in FIG. 5, the angle θ3 in the orientation direction of the third cover ply 5 is in the state of θ3=−45° as shown in FIG. 6.

With the above configuration, since the third cover ply 5 contains the reinforcement fiber having the orientation direction, the reinforcement fiber can exert the great strength with respect to the load along the orientation direction. Moreover, since the angle θ3 in the orientation direction of the third cover ply 5 with respect to the reference line LS satisfies the relation of θ3=−θ1, it is possible to reduce an influence by anisotropy of the first cover ply 3 and the third cover ply 5, and the reinforcement fiber contained in the first cover ply 3 and the third cover ply 5 can exert the great strength regardless of an application direction of a load. Thus, it is possible to improve the interlayer strength in the stepped portion 23.

In the embodiment shown in FIG. 7, the composite structure 1 includes the one third cover ply 5. However, the composite structure 1 may include the plurality of third cover plies 5. Further, in some other embodiments, the angle θ3 in the orientation direction of the third cover ply 5 may not satisfy the relation of θ3=−θ1 and may satisfy, for example, a relation of θ3=θ1.

Furthermore, in some embodiments described above, similarly to the first cover ply 3, the second cover ply 4 contains the reinforcement fiber having the orientation direction along the direction orthogonal to the lamination direction. A relation of θ2=−θ1 is satisfied, where θ2 is an angle in the orientation direction of the second cover ply 4 with respect to the reference line LS as viewed from the top in the lamination direction. In this case, it is possible to reduce an influence by anisotropy of the first cover ply 3 and the second cover ply 4, and the reinforcement fiber contained in the first cover ply 3 and the second cover ply 4 can exert the great strength regardless of the application direction of the load. Thus, it is possible to improve the interlayer strength in the stepped portion 23.

Figure 8:
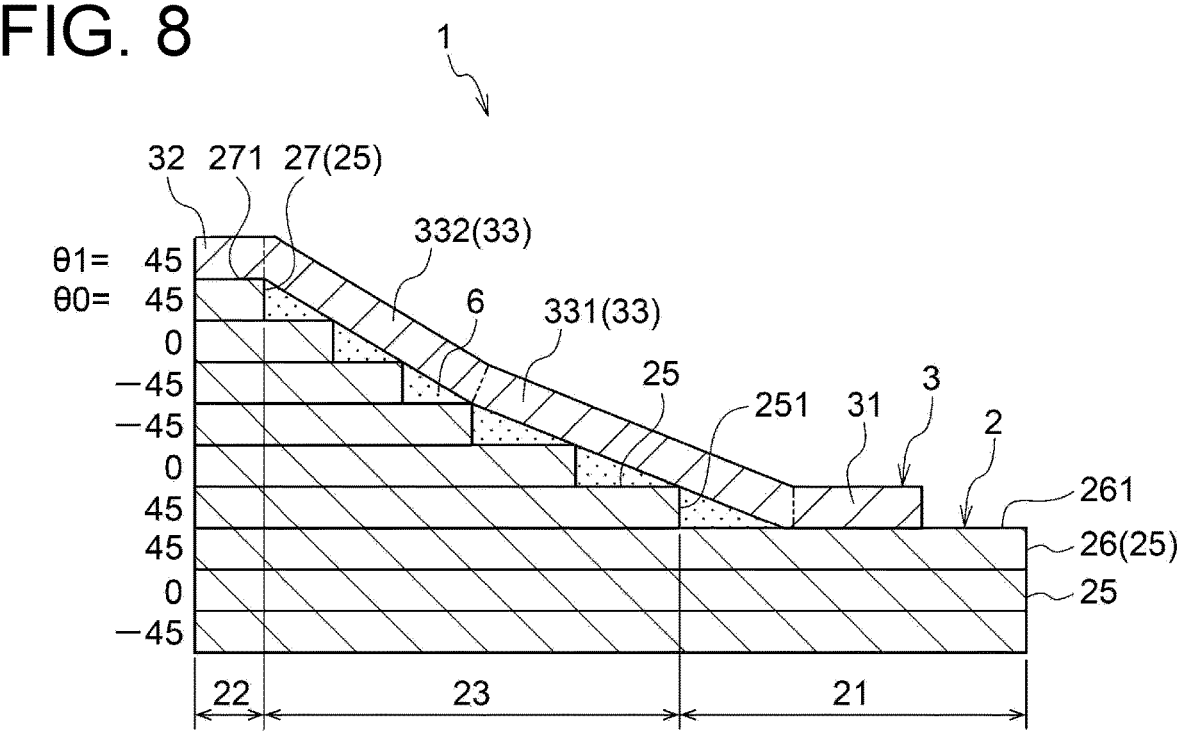
FIG. 8 is a schematic cross-sectional view taken along line A-A shown in FIG. 2 and is a view showing the configuration of the composite structure according to an embodiment.

In some other embodiments, as shown in FIG. 8, the covering portion 33 of the first cover ply 3 includes a first covering portion 331 and a second covering portion 332. FIG. 8 is a schematic cross-sectional view taken along line A-A shown in FIG. 2 and is a view showing the configuration of the composite structure according to an embodiment. As shown in FIG. 8, the first covering portion 331 is formed to continue to the one end portion 31 of the first cover ply 3 and to bend from the one end portion 31, and has an obliquity with respect to the one end portion 31 as viewed from a cross-section along the lamination direction. As shown in FIG. 8, the second covering portion 332 is formed to continue to the other end portion 32 of the first cover ply 3 and to bend from the other end portion 32, and has an obliquity with respect to the other end portion 32 as viewed from the cross-section along the lamination direction. Then, the obliquity with respect to the one end portion 31 of the first covering portion 331 is formed more gently than the obliquity with respect to the other end portion 32 of the second covering portion 332. The first covering portion 331 and the second covering portion 332 are formed linearly in FIG. 8. However, the first covering portion 331 and the second covering portion 332 may each be formed into a staircase shape along the stepped portion 23 of the body portion 2.

With the above configuration, the first covering portion 331 continuing to the one end portion 31 of the first cover ply 3 has the higher degree of stress concentration than the second covering portion 332 continuing to the other end portion 32. However, since the obliquity with respect to the one end portion 31 of the first covering portion 331 is formed more gently than the obliquity with respect to the other end portion 32 of the second covering portion 332, it is possible to improve the interlayer strength in the stepped portion 23 while preventing a destruction in the first covering portion 331 of the first cover ply 3.

In some embodiments described above, as shown in FIGS. 2, 9, the first cover ply 3 is formed so as to cover over the entire surface of the stepped portion 23 of the body portion 2 as viewed from the top in the lamination direction. FIG. 9 is a schematic top view of the composite structure in the lamination direction as viewed from the top according to another embodiment of the present invention. In some embodiment shown in FIG. 9, the first cover ply 3 is formed so as to cover over the entire surface of the stepped portion 23 of the body portion 2, and to cover a part of the surface 261 of the first ply 26 and a periphery adjacent to four sides composing the surface 271 of the second ply 27 as viewed from the top in the lamination direction. In this case, it is possible to improve the interlayer strength in the stepped portion 23 as compared with a case in which the first cover ply 3 covers only a part of the stepped portion 23 as viewed from the top in the lamination direction.

In some other embodiments, as shown in FIG. 10, the first cover ply 3 is formed so as to cover only the part of the stepped portion 23 of the body portion 2 as viewed from the top in the lamination direction. FIG. 10 is a schematic top view of the composite structure in the lamination direction as viewed from the top according to another embodiment of the present invention. In this case, it is possible to improve the interlayer strength in the stepped portion 23 and to avoid occurrence of the extra portion in the first cover ply 3. Thus, it is possible to reduce the weight of the composite structure 1.

Moreover, in the embodiment shown in FIG. 10, the composite structure 1 includes the plurality of first cover plies 3. More specifically, as shown in FIG. 10, the composite structure 1 includes the first cover plies 3 on the respective four sides composing the surface 271 of the second ply 27. The first cover plies 3 each extend along a straight line along which the first structure portion 21 and the second structure portion 22 are at the shortest distance as viewed from the top in the lamination direction. In this case, the each individual first cover ply 3 can cover a portion with a large gradient angle in the stepped portion 23, making it possible to improve the interlayer strength in the stepped portion 23 and to avoid occurrence of the extra portion in the first cover ply 3. Thus, it is possible to reduce the weight of the composite structure 1.

(Delamination Evaluation Test)

Figure 11:
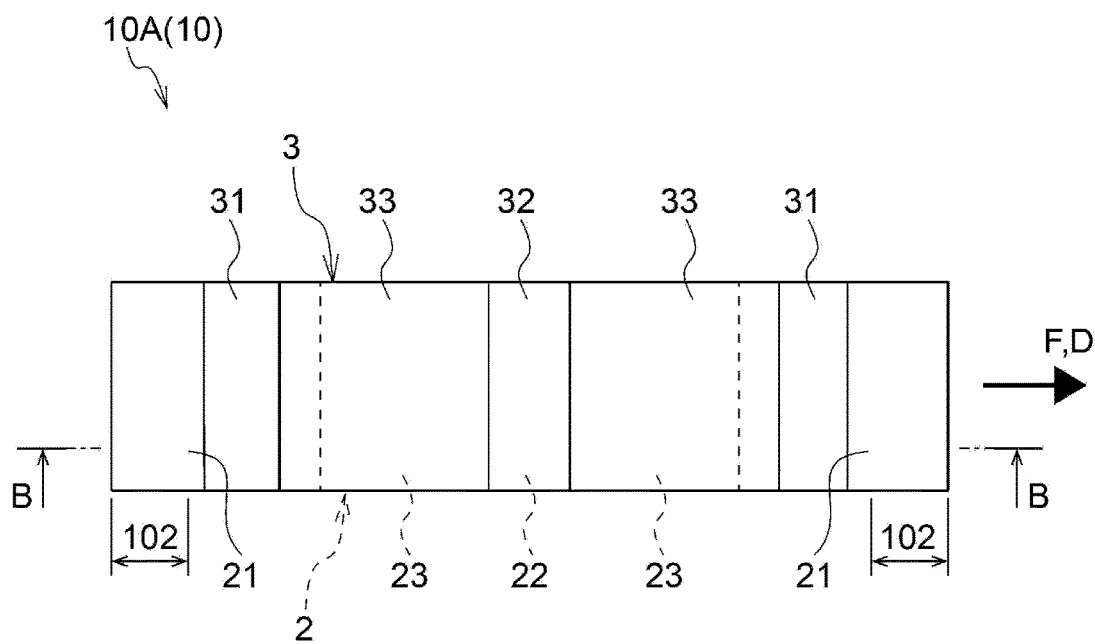
FIG. 11 is a top view showing an example of a test piece used for a delamination evaluation test of the composite structure.
Figure 12:
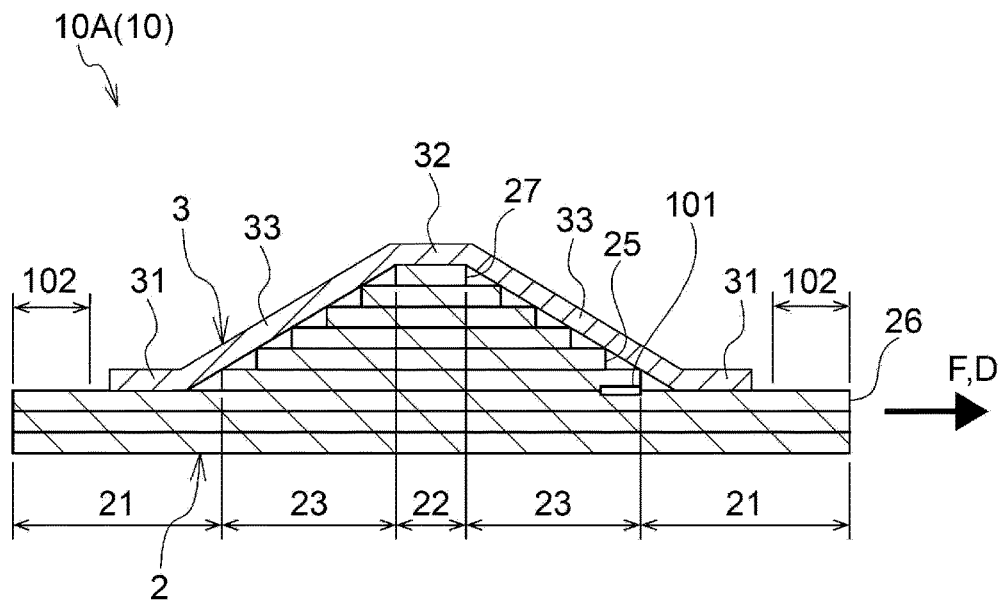
FIG. 12 is a schematic cross-sectional view taken along line B-B shown in FIG. 11 and is a view showing an example of the configuration of the test piece.

For the composite structure 1 according to some embodiments described above, a test piece 10 as shown in FIGS. 11, 12 was produced to be used for conducting a delamination evaluation test. FIG. 11 is a top view showing an example of the test piece used for the delamination evaluation test of the composite structure. FIG. 12 is a schematic cross-sectional view taken along line B-B shown in FIG. 11 and is a view showing an example of the configuration of the test piece.

As shown in FIGS. 11, 12, the test piece 10 changes the shape of the composite structure 1 for the delamination evaluation test. However, the same constituent elements are denoted by the same reference numerals and are not described in detail. As shown in FIG. 11, the test piece 10 is formed into a long plate shape including the body portion 2, includes the second structure portion 22 in the center in the longitudinal direction, and includes the stepped portions 23 and the first structure portions 21 in this order from the center toward both ends in the longitudinal direction. Moreover, as shown in FIG. 12, the test piece 10 includes an artificial defect 101 such that a gap is formed between the first ply 26 and one tip in the longitudinal direction (the end on the right side in FIG. 12) of the ply 25 laminated on the first ply 26. As shown in FIGS. 11, 12, the test piece 10 includes grips 102 at the both ends in the longitudinal direction. In the test piece 10, the two grips 102 are held by a tensile tester, and the one grip 102 (the left side in FIG. 10) in the longitudinal direction is fixed. In the test piece 10, the other grip 102 (the right side in FIG. 10) is pulled in a state in which a tensile load F is controlled to keep an increase in displacement D constant. Then, a delamination progress starting load was detected, which is a load when occurrence of a crack (delamination progress) was visually confirmed in the test piece 10.

The test piece 10 includes a test piece 10A and a test piece 10B each including the body portion 2 and the first cover ply 3 with the angle in the orientation direction being θ1=45°, similarly to the composite structure 1 shown in FIGS. 1, 8.

Similarly to the composite structure 1 shown in FIG. 8, in the test piece 10B, the covering portion 33 of the first cover ply 3 includes the above-described first covering portion 331 and the above-described second covering portion 332.

In addition, the test piece 10 includes a test piece 10C including the body portion 2, the first cover ply 3, and the second cover ply 4, similarly to the composite structure 1 shown in FIG. 3. In the test piece 10C, the angle θ1 in the orientation direction of the first cover ply 3 is in a state of θ1=−45°, the angle θ2 in the orientation direction of the second cover ply 4 is in a state of θ2=45.

In addition, the test piece 10 includes a test piece 10D including the body portion 2, the first cover ply 3, and the third cover ply 5, similarly to the composite structure 1 shown in FIG. 7. In the test piece 10D, the angle θ1 in the orientation direction of the first cover ply 3 is in the state of θ1=−45°, the angle θ3 in the orientation direction of the third cover ply 5 is in the state of θ3=−45°.

The test piece 10 includes, for comparison, a test piece 20A and a test piece 20B each including only the body portion 2 without including the first cover ply 3. In the test piece 20A, H/V=5 as in test pieces 10A, 10B, 10C, 10D described above. In the test piece 20B, H/V=30.

Figure 13:
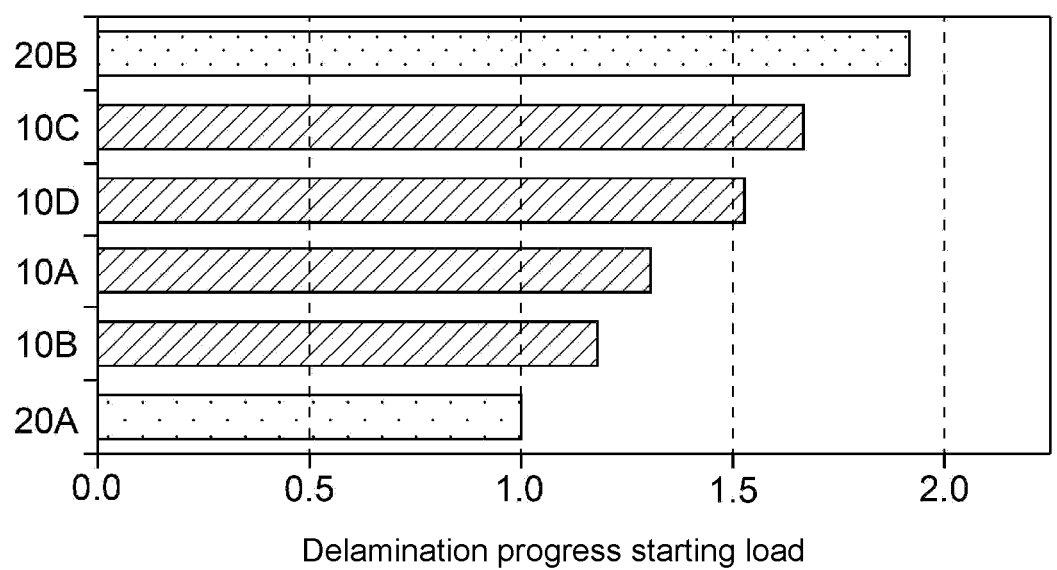
FIG. 13 is a graph showing a delamination progress starting load of each test piece obtained from the delamination evaluation test of the composite structure.

FIG. 13 shows a graph created from a result of the delamination evaluation test described above. FIG. 13 is the graph showing a delamination progress starting load of each test piece obtained from the delamination evaluation test of the composite structure. In FIG. 13, the delamination progress starting load of each test piece 10 is represented by a ratio, where the delamination progress starting load of the test piece 20A is 1.0. As shown in FIG. 13, the test piece 20B having the larger value of H/V and a gentler gradient of the stepped portion 23 than the test piece 20A has the larger delamination progress starting load than the test piece 20A. Further, each of the test pieces 10A to 10D includes only the body portion 2 and has the larger delamination progress starting load than the test piece 20A having the equal value of H/V. Furthermore, the delamination progress starting load of each of the test pieces 10A to 10D increases in the order of the test pieces 10C, 10D, 10A, 10B.

The preferred embodiments of the present invention have been described above. However, the present invention is not limited thereto, and various modifications may be applied as long as they do not depart from the object of the present invention.

In some embodiments described above, the plurality of plies 25, the first cover ply 3, the second cover ply 4, and the third cover ply 5 each contain the fiber-reinforced plastic whose strength is improved by putting the reinforcing fiber such as the carbon fiber in the thermosetting resin (plastic) such as the epoxy resin serving as the base material. However, the present invention is not limited to this. For example, the plurality of plies 25, the first cover ply 3, the second cover ply 4, and the third cover ply 5 may each contain unsaturated polyester, a polyamide resin, or phenol resin as a base material, or may each contain a thermoplastic resin such as methyl methacrylate. Alternatively, the plurality of plies 25, the first cover ply 3, the second cover ply 4, and the third cover ply 5 may each contain the carbon fiber as a reinforcing fiber and may each include a carbon fiber reinforced carbon composite material using carbon as a base material. Alternatively, the plurality of plies 25, the first cover ply 3, the second cover ply 4, and the third cover ply 5 may each contain a glass fiber or Kevlar as a reinforcing fiber, or may each be a composite other than the fiber-reinforced plastic.

Moreover, in some other embodiments, the plurality of plies 25, the first cover ply 3, the second cover ply 4, and the third cover ply 5 may not each contain the reinforcement fiber having the orientation direction. Moreover, the first cover ply 3, the second cover ply 4, and the third cover ply 5 may each be formed by a material different from that of the plurality of plies 25. Moreover, in some other embodiments, the covering portion 33 of the first cover ply 3, the covering portion 43 of the second cover ply 4, and the covering portion 53 of the third cover ply 5 may not firmly be fixed to the stepped portion 23 and the like of the body portion 2. Moreover, the first cover ply 3, the second cover ply 4, and the third cover ply 5 is firmly fixed to the plies 25 and the like by the thermosetting resin contained therein. However, the second cover ply 4, and the third cover ply 5 may firmly be fixed to the plies 25 and the like by another method of, for example, depositing a resin or the like or bonding by using a bonding material.

The present invention is not limited to the above-described embodiment, and also includes an embodiment obtained by modifying the above-described embodiment and an embodiment obtained by combining these embodiments as appropriate.

REFERENCE SIGNS LIST

1 Composite structure
2 Body portion
21 First structure portion
22 Second structure portion
23 Stepped portion
25 Ply
251 End surface
26 First ply
261 Surface
27 Second ply
271 Surface
3 First cover ply
31 One end portion
32 Other end portion
33 Covering portion
331 First covering portion
332 Second covering portion
4 Second cover ply
41 One end portion
42 Other end portion
43 Covering portion
5 Third cover ply
51 One end portion
52 Other end portion
53 Covering portion
6 Eluted resin
10, 10A to 10D, 20A, 20B Test piece
101 Artificial defect
102 Grip
D Displacement
F Tensile load
H Horizontal distance
LO Orthogonal line
LS Reference line
V Vertical distance

The invention claimed is:

1. A composite structure which includes a stepped portion formed by laminating a plurality of plies with end surfaces thereof being shifted from each other, the composite structure comprising:

a body portion which includes a first structure portion where a first ply of the plurality of plies is laminated on a top layer of the first structure portion, a second structure portion where a second ply of the plurality of plies is laminated on a top layer of the second structure portion, and the stepped portion disposed between the first structure portion and the second structure portion, the second ply being different from the first ply and positioned at a distance from the first ply in a lamination direction which is a direction where the plurality of plies are laminated; and a first cover ply which includes a covering portion, a first end portion, and a second end portion, the first cover ply being formed so as to cover only a part of a surface of the first ply or a part of a surface of the second ply, the covering portion entirely covering the stepped portion, the first end portion extending from a first end part of the covering portion along a direction orthogonal to the lamination direction, the second end portion extending from a second end part of the covering portion along the direction orthogonal to the lamination direction, wherein the first end portion continuously extends along an entire circumference of the covering portion as viewed from above in the lamination direction.

2. The composite structure according to claim 1, further comprising a second cover ply arranged between the first ply and the first cover ply in the lamination direction, wherein the second cover ply includes a covering portion covering the stepped portion, a first end portion, and a second end portion, the first end portion extending from a first end part of the covering portion along the direction orthogonal to the lamination direction, the second end portion extending from a second end part of the covering portion along the direction orthogonal to the lamination direction, and being interposed between two plies of the plurality of plies arranged between the first ply and the second ply in the lamination direction.

3. The composite structure according to claim 1, wherein the first cover ply contains a reinforcement fiber having an orientation direction, and wherein the orientation direction of the first cover ply intersects with a direction orthogonal to a reference line having the shortest distance between the first structure portion and the second structure portion as viewed from above in the lamination direction.

4. The composite structure according to claim 3, wherein θ1 is in a range of 45±15° or −45±15°, where θ1 is an angle in the orientation direction of the first cover ply with respect to the reference line as viewed from above in the lamination direction.

5. The composite structure according to claim 3, wherein θ1 is in a range of 0±15°, where θ1 is an angle in the orientation direction of the first cover ply with respect to the reference line as viewed from above in the lamination direction.

6. The composite structure according to claim 3, further comprising a second cover ply arranged on a side opposite to the first ply with respect to the first cover ply in the lamination direction.

7. The composite structure according to claim 6, wherein the second cover ply contains the reinforcement fiber having the orientation direction, and wherein a relation of θ3=−θ1 is satisfied, where θ1 is an angle in the orientation direction of the first cover ply with respect to the reference line, and θ3 is an angle in the orientation direction of the second cover ply with respect to the reference line as viewed from above in the lamination direction.

8. The composite structure according to claim 1, wherein the covering portion of the first cover ply includes:

a first covering portion continuing to the first end portion of the first cover ply and has an obliquity with respect to the first end portion as viewed from a cross-section along the lamination direction; and a second covering portion continuing to the second end portion of the first cover ply and has an obliquity with respect to the second end portion as viewed from the cross-section along the lamination direction, and wherein the obliquity of the first covering portion with respect to the first end portion is formed more gently than the obliquity of the second covering portion with respect to the second end portion.

9. The composite structure according to claim 1, wherein, in the stepped portion, provided that H is a horizontal distance, and V is a vertical distance, a ratio H/V of the horizontal distance to the vertical distance is in a range of 1≤H/V<30.

10. A composite structure which includes a stepped portion formed by laminating a plurality of plies with end surfaces thereof being shifted from each other, the composite structure comprising:

a body portion which includes a first structure portion where a first ply of the plurality of plies is laminated on a top layer of the first structure portion, a second structure portion where a second ply of the plurality of plies is laminated on a top layer of the second structure portion, and the stepped portion disposed between the first structure portion and the second structure portion, the second ply being different from the first ply and positioned at a distance from the first ply in a lamination direction which is a direction where the plurality of plies are laminated; and a plurality of first cover plies, wherein each first cover ply includes a covering portion covering the stepped portion, a first end portion, and a second end portion, wherein each first cover ply is formed so as to cover only a part of a surface of the first ply and a part of a surface of the second ply, the first end portion extending from a first end part of the covering portion along a direction orthogonal to the lamination direction, the second end portion extending from a second end part of the covering portion along the direction orthogonal to the lamination direction, and wherein the plurality of first cover plies are each formed so as to cover only a respective part of the stepped portion as viewed from above in the lamination direction.

* * * * *